US012084109B2

(12) United States Patent
Kasai et al.

(10) Patent No.: US 12,084,109 B2
(45) Date of Patent: Sep. 10, 2024

(54) VEHICLE CONTROL DEVICE

(71) Applicant: HITACHI AUTOMOTIVE SYSTEMS, LTD., Hitachinaka (JP)

(72) Inventors: Shinya Kasai, Tokyo (JP); Masato Imai, Tokyo (JP); Takashi Tsutsui, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 529 days.

(21) Appl. No.: 16/962,381

(22) PCT Filed: Dec. 11, 2018

(86) PCT No.: PCT/JP2018/045406
§ 371 (c)(1),
(2) Date: Jul. 15, 2020

(87) PCT Pub. No.: WO2019/142544
PCT Pub. Date: Jul. 25, 2019

(65) Prior Publication Data
US 2021/0061356 A1 Mar. 4, 2021

(30) Foreign Application Priority Data

Jan. 17, 2018 (JP) .................................. 2018-006013

(51) Int. Cl.
*B62D 15/02* (2006.01)
*G01C 21/34* (2006.01)
(52) U.S. Cl.
CPC ....... *B62D 15/0285* (2013.01); *B62D 15/021* (2013.01); *G01C 21/3407* (2013.01)
(58) Field of Classification Search
None
See application file for complete search history.

(56) References Cited

U.S. PATENT DOCUMENTS 6,542,800 B2 *  4/2003  Kawazoe ........ B60W 30/18145
                                                            701/28
8,538,631 B2 *  9/2013  Lee ..................... B62D 15/0285
                                                              701/1
(Continued)

FOREIGN PATENT DOCUMENTS

DE   102006018261 A1 * 10/2007 ......... B62D 15/0285
JP   2006-008009 A      1/2006
(Continued)

OTHER PUBLICATIONS

Park, M., Lee, S. and Han, W. (2015), Development of Steering Control System for Autonomous Vehicle Using Geometry-Based Path Tracking Algorithm. ETRI Journal, 37: 617-625. (Year: 2015).*
(Continued)

*Primary Examiner* — Redhwan K Mawari
*Assistant Examiner* — Kai N Wang
(74) *Attorney, Agent, or Firm* — Foley & Lardner LLP

(57) ABSTRACT

A vehicle control device includes a route processor that generates a route from a current location position to a target position. The target position remains constant. The vehicle control device further includes a steering pattern processor that generates a target steering angle, which is a target value of a steering angle for the route, and outputs steering angle information indicating the generated target steering angle. The vehicle control device further includes a steering angle processor that corrects the steering angle information such that a transition curve section of the route includes a steering angle increasing section where the steering angle is below the target steering angle and a steering angle decreasing section where the steering angle exceeds the target steering angle. The vehicle control device further includes a steering controller that performs steering control based on the steer- (Continued)

ing angle information corrected by the steering angle processor.

16 Claims, 13 Drawing Sheets

(56) References Cited

U.S. PATENT DOCUMENTS

| | | | | |
|---|---|---|---|---|
| 9,457,842 | B2* | 10/2016 | Takano | B62D 15/027 |
| 10,137,932 | B2* | 11/2018 | Oguro | G05D 1/0212 |
| 10,239,557 | B2* | 3/2019 | Inoue | B62D 15/025 |
| 2004/0193374 | A1* | 9/2004 | Hac | G08G 1/166 |
| | | | | 701/301 |
| 2008/0077294 | A1* | 3/2008 | Danz | B62D 15/028 |
| | | | | 701/41 |
| 2008/0097666 | A1* | 4/2008 | Oba | B66F 9/07568 |
| | | | | 701/41 |
| 2013/0131925 | A1 | 5/2013 | Isaji | |
| 2013/0304322 | A1 | 11/2013 | Isaji | |
| 2016/0075329 | A1* | 3/2016 | Tomozawa | B60W 10/20 |
| | | | | 701/41 |
| 2016/0288785 | A1 | 10/2016 | Ezoe | |
| 2016/0368530 | A1* | 12/2016 | Chang | B62D 6/008 |
| 2017/0174257 | A1* | 6/2017 | Düring | B62D 6/00 |
| 2017/0240205 | A1 | 8/2017 | Nakada | |
| 2018/0093709 | A1* | 4/2018 | Oguro | B60W 30/12 |
| 2018/0178838 | A1* | 6/2018 | Inoue | B62D 15/025 |
| 2018/0297589 | A1 | 10/2018 | Hasejima | |
| 2019/0054916 | A1 | 2/2019 | Akiyama | |

FOREIGN PATENT DOCUMENTS

| | | | |
|---|---|---|---|
| JP | 2006-111184 | A | 4/2006 |
| JP | 2008-501563 | A | 1/2008 |
| JP | 2010076722 | A * | 4/2010 |
| JP | 2010195118 | A * | 9/2010 |
| JP | 2010202142 | A * | 9/2010 |
| JP | 2013-126854 | A | 6/2013 |
| JP | 2013126868 | A * | 6/2013 |
| JP | 2013-226973 | A | 11/2013 |
| JP | 2014-026516 | A | 2/2014 |
| JP | 2014024462 | A * | 2/2014 |
| JP | 5510379 | B2 * | 6/2014 |
| JP | 2016-060223 | A | 4/2016 |
| JP | 2016-187995 | A | 11/2016 |
| JP | 2017-81398 | A | 5/2017 |
| JP | 2017-149184 | A | 8/2017 |
| JP | 2017-190013 | A | 10/2017 |
| JP | 2017-202725 | A | 11/2017 |
| WO | WO-2017/183486 | A1 | 10/2017 |

OTHER PUBLICATIONS

International Search Report with English translation and Written Opinion issued in corresponding application No. PCT/JP2018/045406 dated Mar. 19, 2019.

* cited by examiner

FIG. 5
(a) ROUTE CONSTITUTED BY STRAIGHT LINE, ARC, AND TRANSITION CURVE
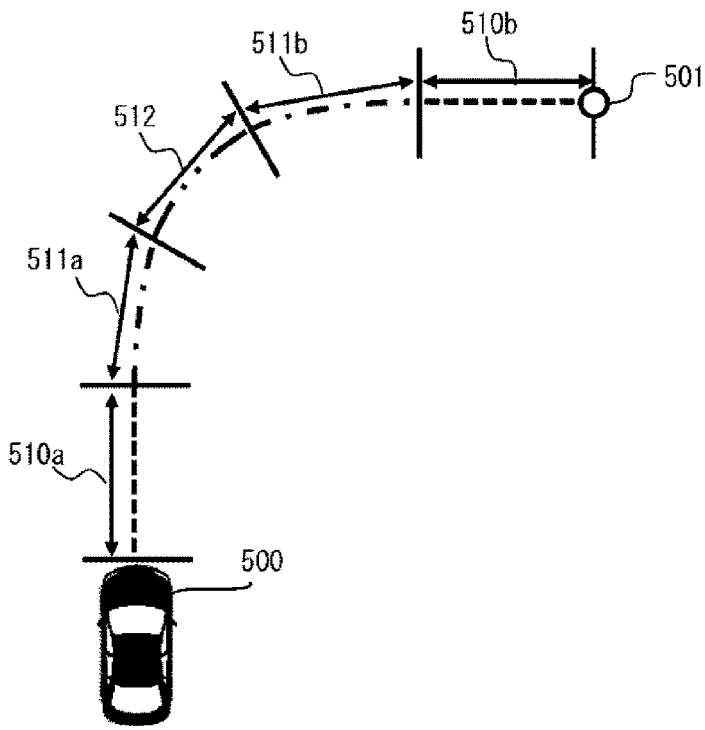
(b) STEERING ANGLE INFORMATION CONSTITUTED BY STRAIGHT LINE, ARC, AND TRANSITION CURVE
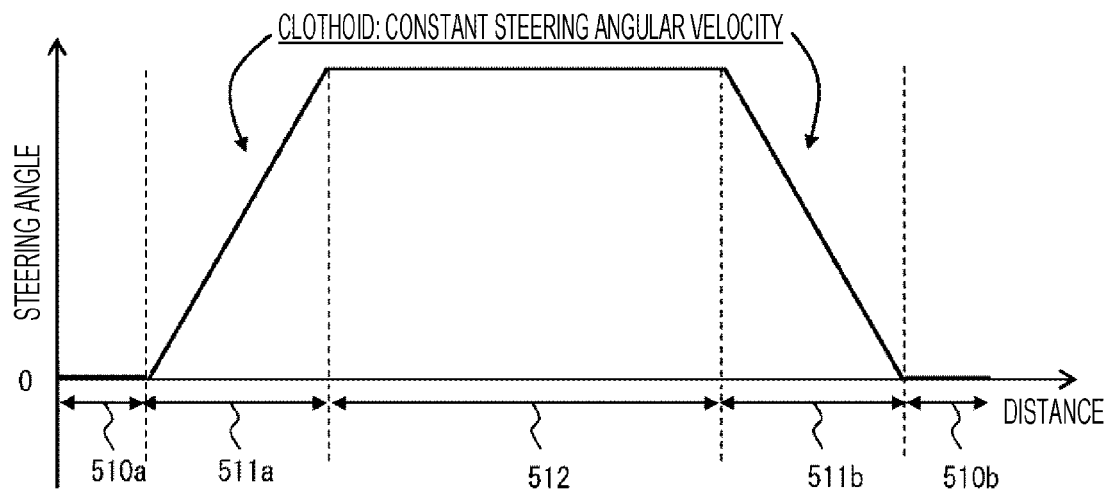

FIG. 8
(a) ROUTE CONSTITUTED BY STRAIGHT LINE, ARC, AND TRANSITION CURVE
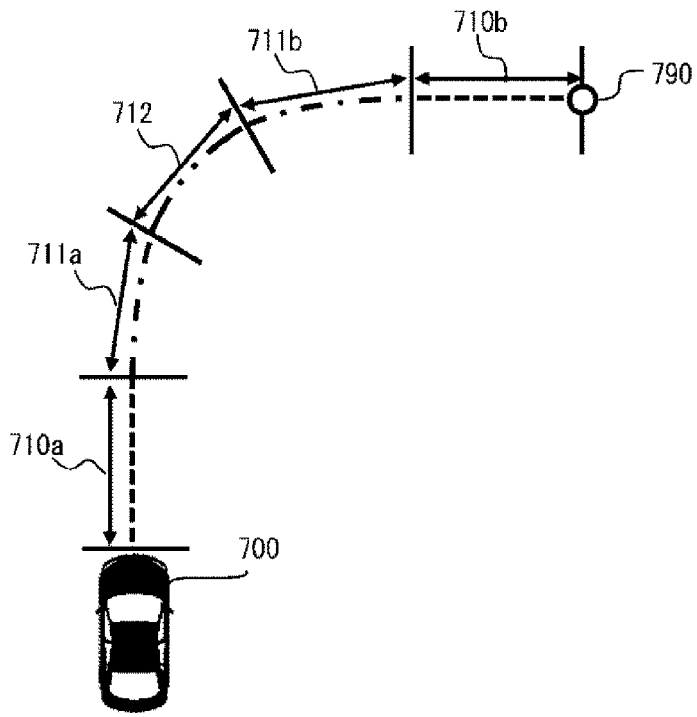
(b) STEERING ANGLE INFORMATION CONSTITUTED BY STRAIGHT LINE, ARC, AND TRANSITION CURVE
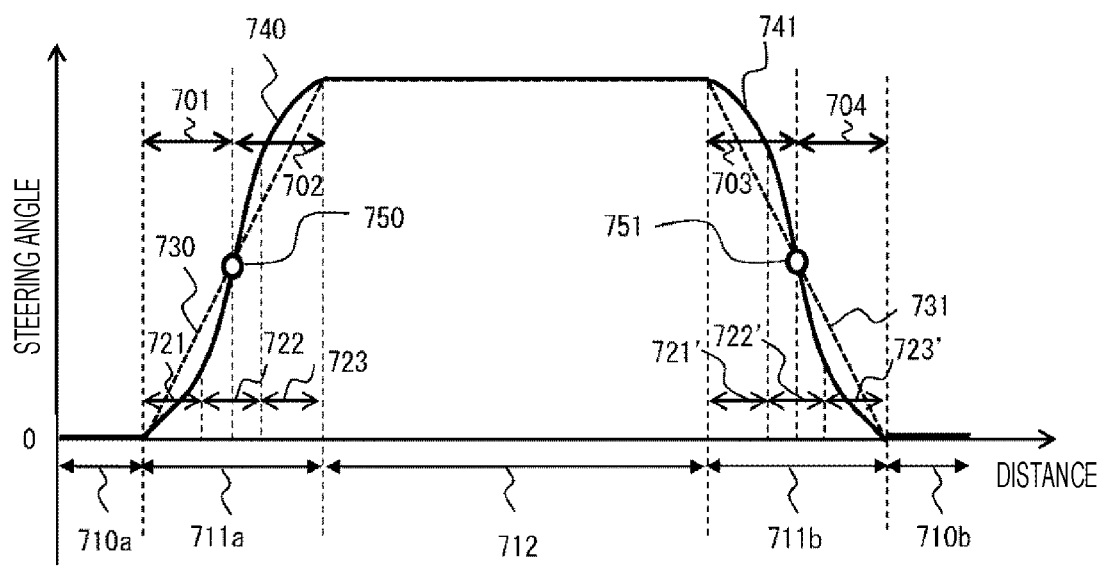

FIG. 11
(a) BEFORE PARKING
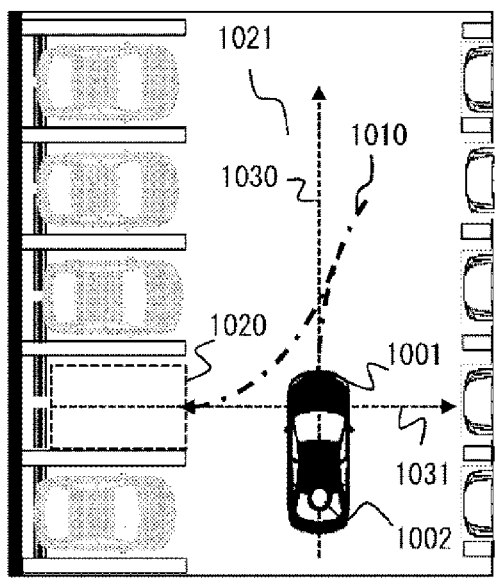
(b) AFTER PARKING
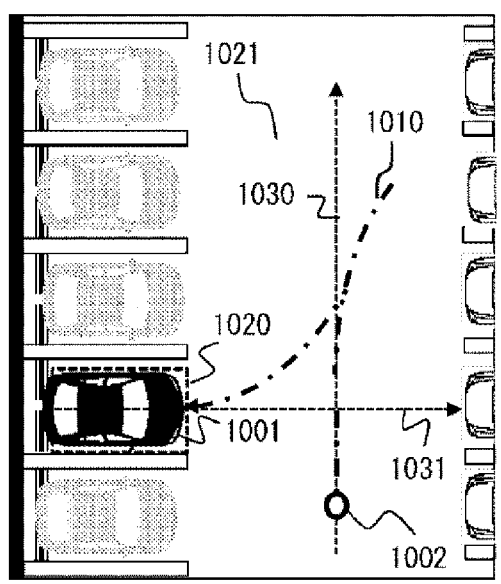

VEHICLE CONTROL DEVICE

TECHNICAL FIELD

The present invention relates to a vehicle control device.

BACKGROUND ART

Driving support systems have been developed to prevent traffic accidents and mitigate driver's driving load during traffic jams. One of the driving support systems is automatic parking. In the automatic parking, when a driver specifies a target parking frame, some or all of accelerator, brake, and steering operations are automatically performed to park a vehicle in the target parking frame.

In such automatic parking, for example, when the vehicle is moved based on a route geometrically calculated with a straight line and an arc, a steering angle amount changes stepwise at a connection portion between the straight line and the arc, and the followability deteriorates. For this reason, in PTL 1, a steering angle amount is linearly changed to maintain the followability by introducing a clothoid curve as a transition curve between a straight line and an arc. In PTL 1, the clothoid curve in which a steering angular velocity is constant is introduced in a transition curve section, and there is no consideration on a steering angular acceleration.

CITATION LIST

Patent Literature

PTL 1: JP 2017-81398 A

SUMMARY OF INVENTION

Technical Problem

In a technique disclosed in PTL 1, the steering angular acceleration becomes steep in the transition curve section, and sudden control is required for steering follow-up control, so that there is a problem that a steering wheel behavior at the time of the steering control is suddenly changed. This sudden change in the steering wheel behavior causes large lateral movement G for a driver, which gives the driver an uncomfortable feeling.

Such a problem is not limited to the vehicle drive control in the automatic parking, similarly occurs in the vehicle drive control for moving a host vehicle position to a target position.

Solution to Problem

A vehicle control device according to the present invention includes: a route generation unit that generates a route from a current location to a destination; a steering pattern generation unit that generates a target steering angle, which is a target value of a steering angle for the route, and outputs steering angle information indicating the generated target steering angle; a steering angle correction unit that corrects the steering angle information such that a section where the target steering angle changes includes a section where the steering angle is below the target steering angle of the section and a section where the steering angle exceeds the target steering angle; and a steering control unit that performs steering control based on the steering angle information corrected by the steering angle correction unit.

Advantageous Effects of Invention

According to this invention, it is possible to suppress a sudden change of a steering wheel behavior at the time of steering control which is one of factors causing driver's uncomfortable feeling, and to perform automatic steering with the less discomfort feeling.

BRIEF DESCRIPTION OF DRAWINGS

FIGS. 5(a) and 5(b) are views illustrating examples of route information and steering angle information.

FIGS. 8(a) and 8(b) are views illustrating examples of route information and corrected steering angle information.

FIGS. 11(a) and 11(b) are views illustrating examples of a parking state of a vehicle.

DESCRIPTION OF EMBODIMENTS

Next, embodiments of the present invention will be described.

First Embodiment

Figure 1:
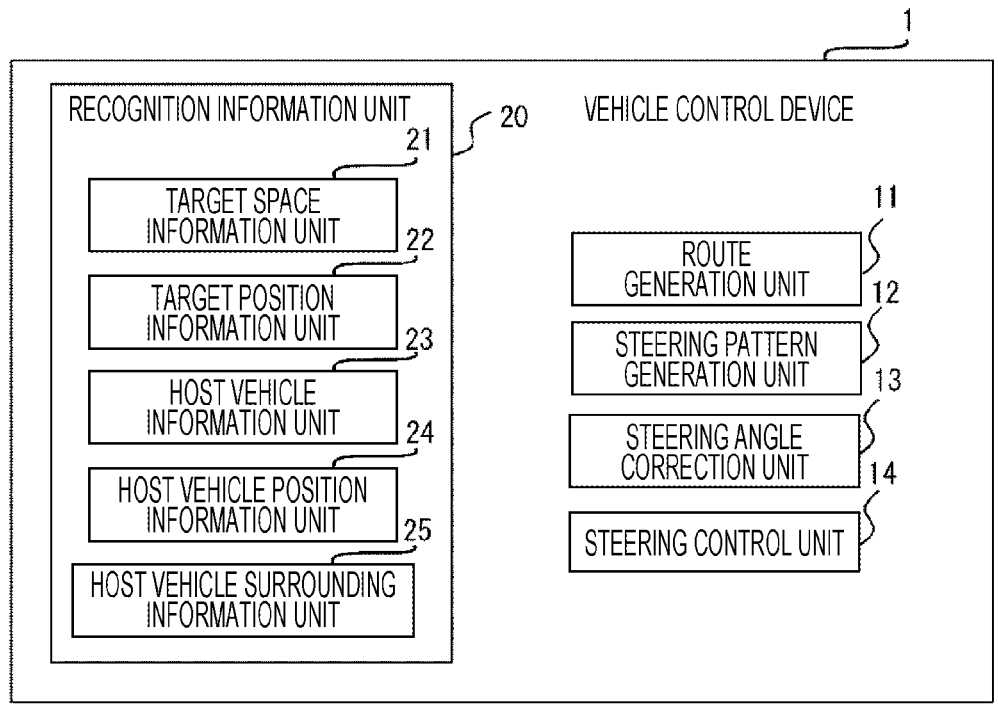
FIG. 1 is a configuration diagram of a vehicle control device according to a first embodiment.

FIG. 1 is a configuration diagram of a vehicle control device 1 according to a first embodiment. As illustrated in FIG. 1, the vehicle control device includes a route generation unit 11, a steering pattern generation unit 12, a steering angle correction unit 13, a steering control unit 14, and a recognition information unit 20. The recognition information unit 20 includes a target space information unit 21, a target position information unit 22, a host vehicle information unit 23, a host vehicle position information unit 24, and a host vehicle surrounding information unit 25. The vehicle control device 1 generates route information from a current position to a target position, generates steering angle information for a route, and controls steering of a steering wheel based on the steering angle information.

The target space information unit 21 has information serving as a constraint condition on vehicle traveling, such as positions and distances of obstacles around the target position. Regarding the obstacles herein, both a stationary three-dimensional object and a moving object are collectively referred to as the obstacles. Examples of the stationary three-dimensional object include a parked vehicle, a wall, a pole, a pylon, a curb, a bollard, and the like. In addition, examples of the moving object include a pedestrian, a bicycle, a motorcycle, a vehicle, and the like.

The target position information unit 22 has information such as a shape of the target position and a relative position with respect to the host vehicle. The target space information unit 21 and the target position information unit 22 acquire information from an external recognition sensor mounted on the host vehicle. An example of the external recognition sensor is an in-vehicle camera such as a stereo camera and a monocular camera. The stereo camera is a device that acquires information on surrounding environment of the host vehicle, and captures an image of the front of the host vehicle while measuring the distance. In addition, the monocular cameras are arranged one by one at each of the front, the rear, the right side, and the left side of the host vehicle to capture each of the surrounding environments. Using these in-vehicle cameras, the stationary three-dimensional object, the moving object, a road marking such as a lane dividing line or a frame line around the host vehicle are detected. A laser radar, a millimeter-wave radar, a sonar, or the like is used as an external recognition sensor other than the in-vehicle camera. In addition, information on the surrounding environment may be acquired by road-to-vehicle and vehicle-to-vehicle communication.

The host vehicle information unit 23 has information that is an upper limit of a behavior of the host vehicle, such as a turning radius of the host vehicle, a setting value of a steering angular velocity upper limit, and a setting value of a steering angular acceleration.

The host vehicle position information unit 24 obtains host vehicle position information by dead reckoning that is calculated based on a vehicle model based on a steering angle and a vehicle velocity, and a rotational speed of wheels of the host vehicle. Alternatively, the host vehicle position information may be obtained using position information acquired by a sensor such as a GPS or by road-to-vehicle and vehicle-to-vehicle communication.

The host vehicle surrounding information unit 25 has information serving as a constraint condition on the surroundings of the host vehicle, such as positions and distances of obstacles around the host vehicle position.

To the route generation unit 11, information is input from the target space information unit 21, the target position information unit 22, the host vehicle information unit 23, the host vehicle position information unit 24, and the host vehicle surrounding information unit 25 via a dedicated line or a controller area network (CAN). Then, the route information from the current position to the target position is generated based on the input.

The steering pattern generation unit 12 generates the steering angle information according to a traveling distance based on the route information of the route generation unit 11. Here, a target steering angle at which the steering angular velocity is constant is generated as a target value of a steering angle for the route generated by the route generation unit 11, and the steering angle information indicating the generated target steering angle is output.

The steering angle correction unit 13 corrects the steering angle information generated by the steering pattern generation unit 12 based on the steering angular velocity and the steering angular acceleration of the host vehicle information unit 23. The correction of t steering angle information will be described in detail in a second embodiment relating to a vehicle control device in which an automatic parking assistance device is mounted, but is roughly described as follows.

The steering control unit 14 calculates the traveling distance of the host vehicle based on the host vehicle position information of the host vehicle position information unit 24, and performs steering control such that the vehicle travels on the route using the steering angle information corrected by the steering angle correction unit 13.

Second Embodiment

Figure 2:
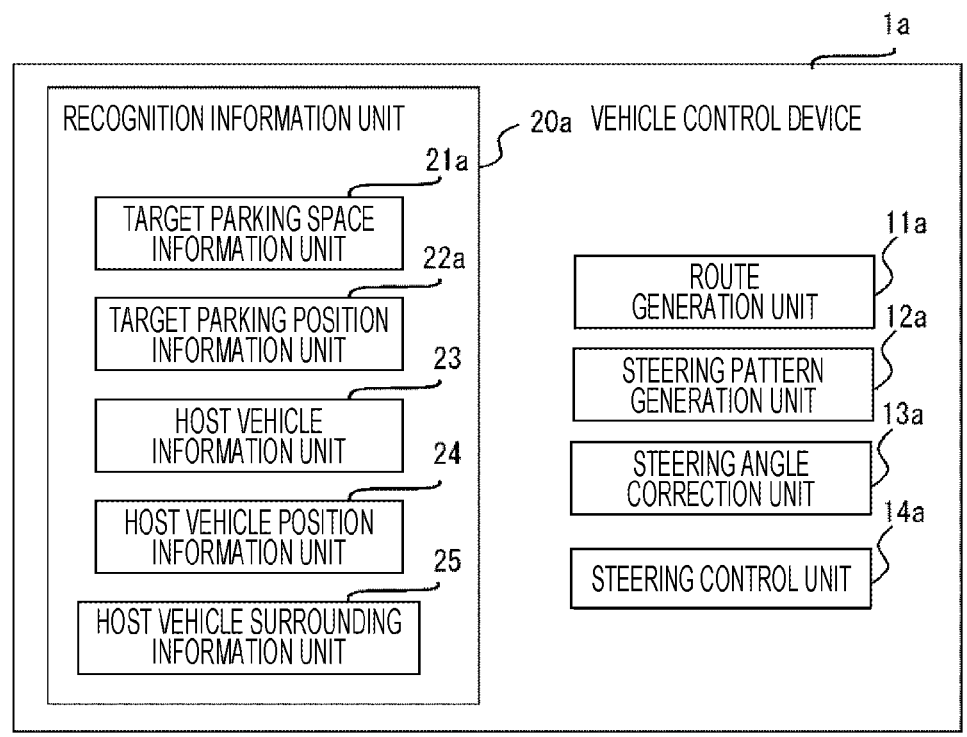
FIG. 2 is a configuration diagram of a vehicle control device according to a second embodiment.

The vehicle control device according to the second embodiment will be described with reference to FIG. 2. FIG. 2 is a block diagram in a case where the vehicle control device of the first embodiment illustrated in FIG. 1 is implemented as the automatic parking assistance device. Differences from the vehicle control device 1 of FIG. will be mainly described, and the same components as those in FIG. 1 will be denoted by the same reference signs, and the description thereof will be omitted.

As illustrated in FIG. 2, a vehicle control device 1a includes a route generation unit 11a, a steering pattern generation unit 12a, a steering angle correction unit 13a, a steering control unit 14a, and a recognition information unit 20a. The recognition information unit 20a has a configuration in which the target space information unit 21 in FIG. 1 is replaced with a target parking space information unit 21a, and the target position information unit 22 in FIG. 1 is replaced with a target parking position information unit 22a.

The target parking space information unit 21a has information serving as a constraint condition on a target space, such as positions and distances of obstacles around a target parking position.

The target parking position information unit 22a has information such as a shape of the target parking position and a relative position with respect to a host vehicle.

The route generation unit 11a generates route information from a current host vehicle position to the target parking position. This route information includes a straight line, an arc, and a transition curve. In addition, the transition curve is represented by route information based on a calculation with a constant steering angular velocity using a clothoid curve.

The steering pattern generation unit 12a generates steering angle information corresponding to a traveling distance based on the route information generated by the route generation unit 11a. Here, a target steering angle at which the steering angular velocity is constant is generated as a target value of a steering angle for the route generated by the route generation unit 11a, and the steering angle information indicating the generated target steering angle is output.

The steering angle correction unit 13a corrects the steering angle information by increasing and decreasing the steering angular velocity with respect to the steering angle information generated by the steering pattern generation unit 12a using a setting value of a steering angular velocity upper limit and a setting value of a steering angular acceleration of a steering wheel set in the host vehicle information unit 23 as upper limits. In addition, a traveling distance of the host vehicle calculated based on a host vehicle position on a parking route calculated by the host vehicle position information unit 24, and outputs necessary steering angle information at the host vehicle position on the parking route recognized from the current traveling distance based on the corrected steering angle information.

The steering control unit 14a controls steering based on the steering angle information output from the steering angle correction unit 13a.

Figure 3:
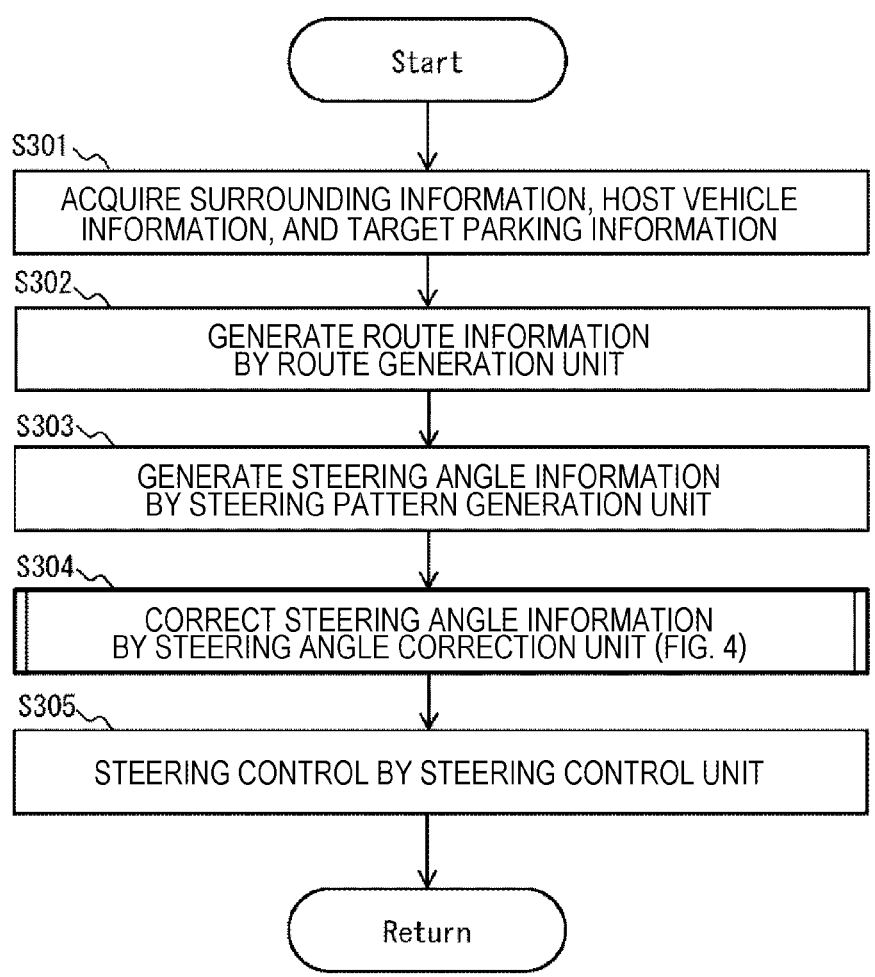
FIG. 3 is a flowchart illustrating a processing operation of the vehicle control device.

FIG. 3 is a flowchart illustrating a processing operation of the vehicle control device 1a. Note that programs illustrated in this flowchart can be executed using a computer that includes a CPU, a memory, and the like. All or some of the processes may be achieved by a hard logic circuit. Further, this program can be provided in the state of being stored in advance in a storage medium of the vehicle control device 1a. Alternatively, the program can be provided in the state of being stored in an independent recording medium, or the program can be recorded and stored in a storage medium of the vehicle control device 1a via a network line. The program may be supplied as various forms of computer-readable computer program products such as a data signal (carrier wave).

In Step S301 of FIG. 3, surrounding information, host vehicle information, and target parking information are acquired. Here, the surrounding information is information acquired by the host vehicle surrounding information unit 25 using the external recognition sensor. The host vehicle information is each information of the host vehicle information unit 23 and the host vehicle position information unit 24. As described above, the information of the host vehicle information unit 23 information serving as an upper limit of a behavior of the host vehicle such as a turning radius of the host vehicle, and the setting value of the steering angular velocity upper limit and the setting value of the steering angular acceleration of the steering wheel, and is referred to as the host vehicle information hereinafter. The information of the host vehicle position information unit 24 is host vehicle position information acquired by a sensor such as dead reckoning and a GPS. The target parking information is information of each of the target parking space information unit 21a and the target parking position information unit 22a, and is information obtained using the external recognition sensor. The information of the target parking space information unit 21a is information serving as a constraint condition on a target space, such as positions and distances of obstacles around a target parking position. The information of the target parking position information unit 22a is information such as a shape of the target parking position and a relative position with respect to a host vehicle. Next, the processing proceeds to Step S302.

In Step S302, the route generation unit 11a generates route information using the information acquired in Step S301, outputs the generated route information to the steering pattern generation unit 12a, and the processing proceeds to Step S303.

In Step S303, steering angle information is generated by the steering pattern generation unit 12a using the route information generated in Step S302, the generated steering angle information is output to the steering angle correction unit 13a, and the processing proceeds to Step S304.

In Step S304, the steering angle correction unit 13a corrects the steering angle information using the host vehicle information acquired in Step S301 and the steering angle information generated in Step S303, outputs the steering angle information to the steering control unit 14a using the host vehicle position information acquired in Step S301, and the processing proceeds to Step S305. Details of Step S304 will be described later with reference to FIG. 4.

In Step S305, the steering control unit 14a controls the steering wheel of the host vehicle based on the steering angle information corrected in Step S304, and a series of processes is ended.

Figure 4:
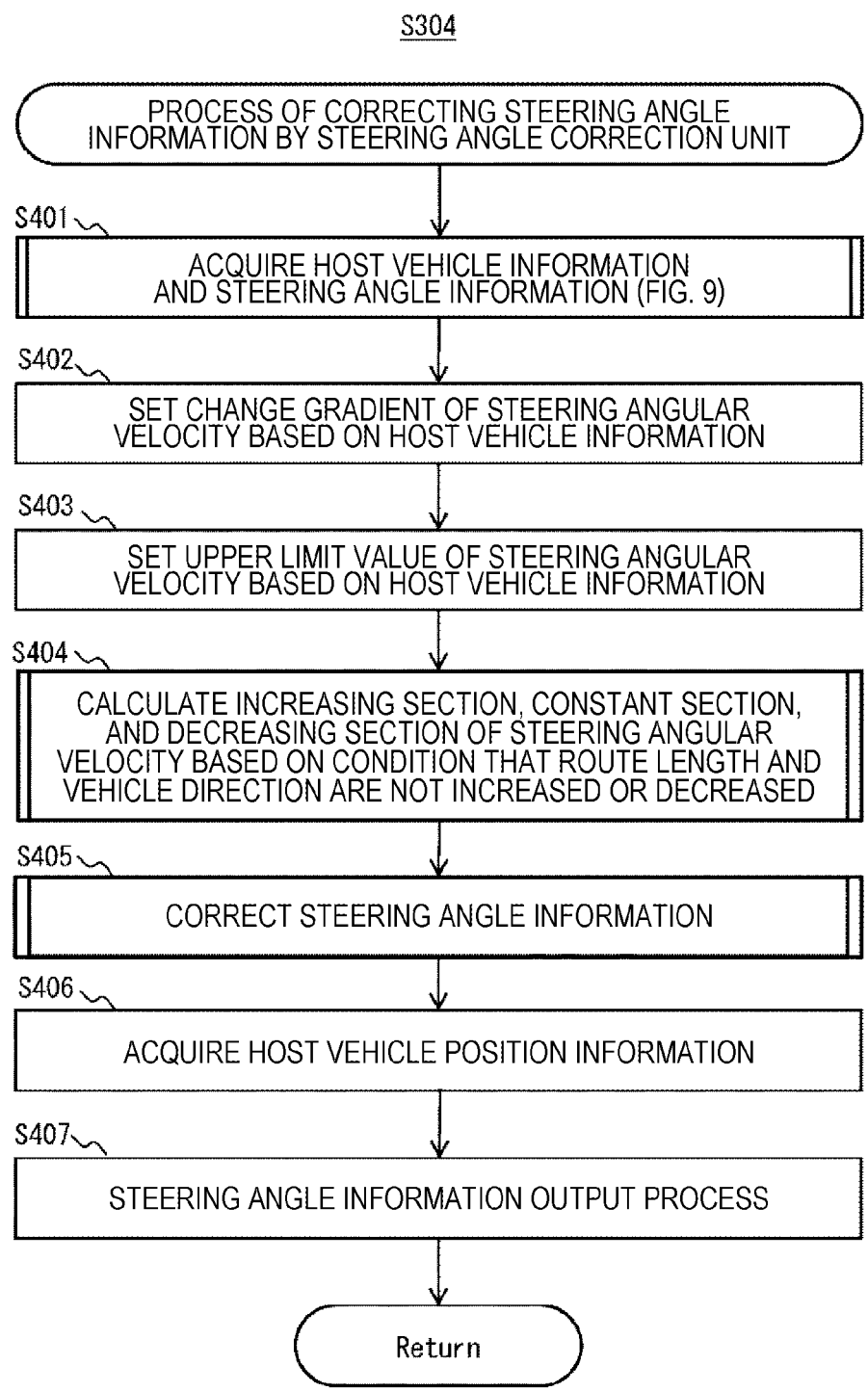
FIG. 4 is a flowchart illustrating a process of correcting steering angle information by the vehicle control device.

FIG. 4 is a flowchart illustrating a process of correcting the steering angle information by the vehicle control device 1a. FIG. 4 is a flowchart illustrating details of Step S304 in FIG. 3.

In Step S401 of FIG. 4, information of the host vehicle information unit 23, that is, the information serving as the upper limit of the behavior of the host vehicle such as the turning radius of the host vehicle, and the setting value of the steering angular velocity upper limit and the setting value of the steering angular acceleration of the steering wheel, and the steering angle information output from the steering pattern generation unit 12a are acquired, and the processing proceeds to Step S402. Details of Step S401 will be described later with reference to FIG. 9.

In Step S402, the setting value of the steering angular acceleration included in the host vehicle information unit 23 is acquired, and the acquired setting value of the steering angular acceleration is set as a change gradient of the steering angular velocity. As a result, in a transition curve section of the steering angle information, a section where the steering angular velocity increases and decreases is set for the steering angle information in which the steering angular velocity output from the steering pattern generation unit 12a is constant. Next, the processing proceeds to Step S403.

In Step S403, the setting value of the steering angular velocity upper limit included in the host vehicle information unit 23 is acquired, and the acquired setting value of the steering angular velocity upper limit value is set as an increase upper limit value of the steering angular velocity in the transition curve section of the steering angle information. Next, the processing proceeds to Step S404.

In Step S404, an increasing section, a constant section, and a decreasing section of the steering angular velocity are calculated under a condition that a route length and a vehicle direction are not increased or decreased. In this calculation, the steering angle information acquired in Step S401, the change gradient of the steering angular velocity set in Step S402, and the increase upper limit value of the steering angular velocity set in Step S403 are used. Details will be described later with reference to FIGS. 5 and 6. Next, the processing proceeds to Step S405.

In Step S405, the steering angle information corrected. In this correction, the change gradient of the steering angular velocity set in Step S402, the increase upper limit value of the steering angular velocity set in Step S403, and the increasing section, the constant section, and the decreasing section of the steering angular velocity calculated in Step S403 are used. Details will be described later with reference to FIG. 8. Next, the processing proceeds to Step S406.

In Step S406, host vehicle position information acquired from the host vehicle position information unit 24, and the processing proceeds to Step S407.

In Step S407, a traveling distance of the host vehicle on a parking route is calculated using the host vehicle position information acquired in Step S406, steering angle information corresponding to the current traveling distance is output based on the steering angle information corrected in Step S405, and a series of processes is ended.

Here, the condition that the route length and the vehicle direction are not increased or decreased in Step S404 in FIG. 4 and the calculation of the increasing section, the constant section, and the decreasing section of the steering angular velocity will be described with reference to FIGS. 5(a), 5(b), and 6.

FIG. 5(a) illustrates a route including a straight line, an arc, and a transition curve, and illustrates an example of the route information generated by the route generation unit 11a.

This is a case where a host vehicle 500 moves to a target parking position 501 by one-side turning, and a route on which the host vehicle 500 travels includes a straight section 510a, a transition curve section 511a (a steering angle increasing section), an arc section 512, a transition curve section 511b (steering angle decreasing section), and a straight section 510b.

FIG. 5(b) illustrates a target steering angle represented by steering angle information before steering angle correction with respect to the route in FIG. 5(a). The vertical axis in FIG. 5(b) represents a steering angle, and the horizontal axis represents a distance. The target steering angle does not change and remains at zero in the straight section 510a, and the target steering angle increases with a gradient corresponding to a constant steering angular velocity due to a clothoid curve in the transition curve section 511a. The target steering angle maintains a constant angle in the arc section 512, the target steering angle decreases with a gradient corresponding to a constant steering angular velocity due to a clothoid curve in the transition curve section 511b, and the target steering angle does not change and remains at zero in the straight section 510b.

Figure 6:
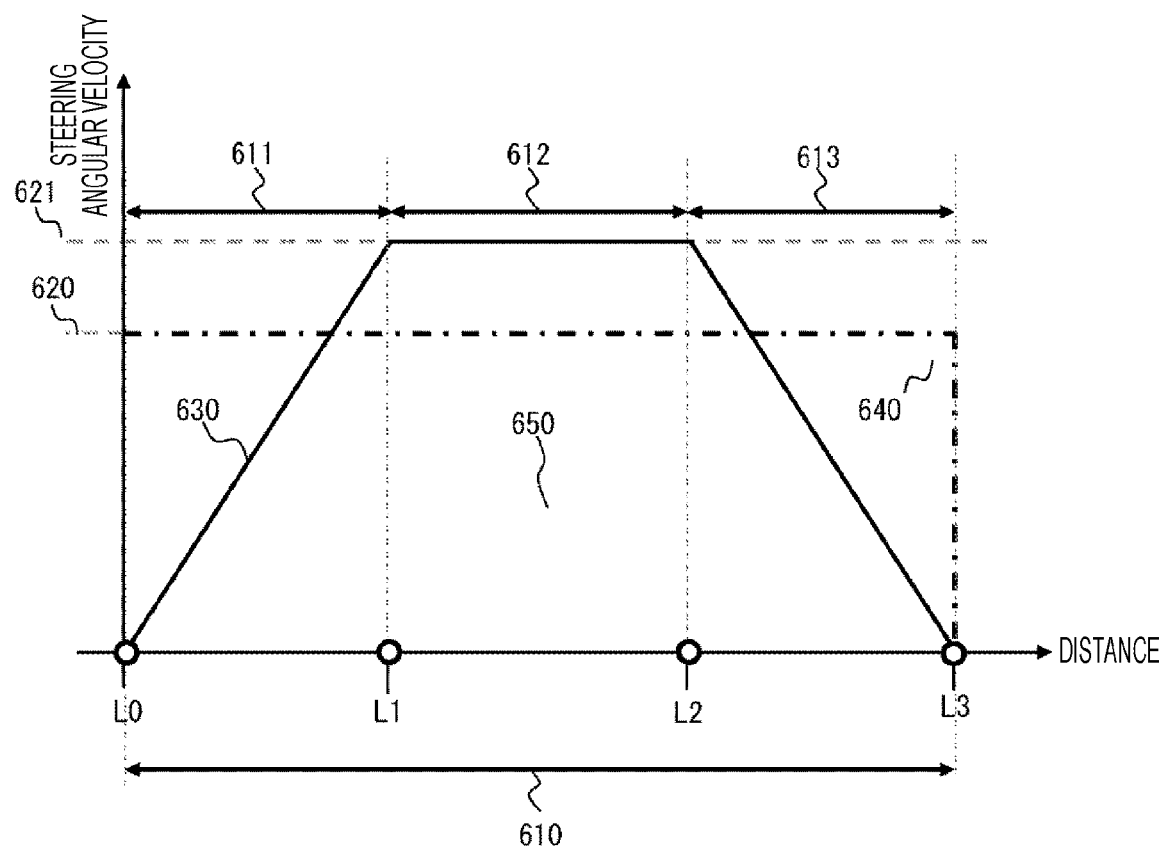
FIG. 6 is a view illustrating a steering angular velocity in a transition curve section (a steering angle increasing section).

FIG. 6 is a view illustrating the steering angular velocity in the transition curve section 511a (steering angle increasing section) in FIG. 5(b). The vertical axis in FIG. 6 represents a steering angular velocity, and the horizontal axis represents a distance. Note that t vertical axis in FIG. 5(b) represents the steering angle, but the vertical axis in FIG. 6 represents the steering angular velocity. In addition, a transition curve section 610 in FIG. 6 is the transition curve section 511a in FIG. 5(b), and a steering angular velocity 620 is the steering angular velocity in the transition curve section 511a in FIG. 5(b).

This will be described with reference to FIG. 6. The steering angular velocity of the target steering angle in the transition curve section 511a in FIG. 5(b) is the steering angular velocity 620 illustrated in FIG. 6, and a steering angular velocity upper limit thereof is a steering angular velocity upper limit 621 illustrated in FIG. 6. A set steering angular acceleration 630, that a change gradient of the steering angular velocity is set as $\ddot{\theta}''_{max}$, the steering angular velocity upper limit 621 is set as $\dot{\theta}'_{max}$, and three sections including an increasing section 611 (L0 to L1), a constant section 612 (L1 to L2), and a decreasing section 613 (L2 to L3) of the steering angular velocity, indicated by steering angle information after correction by the steering angle correction unit 13a are obtained based on the steering angular velocity 620 and the transition curve section 610. L0 is set as a start position, L1 is set as a route distance until the steering angular velocity reaches the upper limit, L2 is set as a route distance until the steering angular velocity becomes constant, and L3 is set as a route distance until the steering angular velocity becomes zero again.

The steering angular velocity 620 is set as θ', and a steering angle 640 (the area of a rectangle in an alternate long and short dash line) is set as θ (=θ'·L3) as an integral value of θ'. In addition, a steering angle 650 (the area of a trapezoid in a solid line), which is an integral value of a corrected steering angular velocity in the transition curve section 610, is expressed by the following Formula (1).
[Formula 1]

$$\theta_{nsw} = \tfrac{1}{2}\dot{\theta}_{max}(L_3 + L_2 - L_1) \quad (1)$$

Here, the condition for not increasing or decreasing the route length and the vehicle direction in Step S404 in FIG. 4 is that the steering angle 640 and the steering angle 650 are equivalent. The route distance L1, the route distance L2, and the route distance L3 are derived from the following Formula (2) that makes the steering angle 640 and the steering angle 650 equivalent.
[Formula 2]

$$\theta = \theta_{nsw}(=\tfrac{1}{2}\dot{\theta}_{max}(L_3+L_2-L_1)) \quad (2)$$

Since the steering angular velocity upper limit 621 is equivalent to a value obtained by multiplying the set steering angular acceleration 630 by the route distance L1 until the steering angular velocity reaches the upper limit, the following Formula (3) is established. In addition, the route distance L1 until the steering angular velocity reaches the upper limit can be expressed as the following Formula (4) using the route distance L2 with the constant steering angular velocity and the route distance L3 until the steering angular velocity becomes zero.

[Formula 3]

$$\dot{\theta}_{max} = \ddot{\theta}_{max} L_1 \quad (3)$$

[Formula 4]

$$L_1 = \frac{L_3 - (L_2 - L_1)}{2} \quad (4)$$

Formulas (3) and (4) are put into Formula (2) to derive the following Formula (5).
[Formula 5]

$$\theta = \tfrac{1}{4}\ddot{\theta}_{max}(L_3-(L_2-L_1))(L_3+L_2-L_1) \quad (5)$$

Formulas (5) is solved for the constant section 612 (L1 to L2) to derive the following Formula (6).

[Formula 6]

$$L_2 - L_1 = \sqrt{L_3^2 - \frac{4\theta}{\ddot{\theta}_{max}}} \quad (6)$$

In addition, Formula (3) is put into Formula (6) to derive the following Formula (7).

[Formula 7]

$$L_1 = \frac{L_3 + \sqrt{L_3^2 - \frac{4\theta}{\ddot{\theta}_{max}}}}{2} \quad (7)$$

As a result, the increasing section (L0 to L1) expressed by Formula (7).

Further, Formula (7) is put into Formula (6) to derive the following Formula (8).

[Formula 8]

$$L_2 = \frac{L_3 + \sqrt{L_3^2 - \frac{4\theta}{\ddot{\theta}_{max}}}}{2} \quad (8)$$

In addition, the steering angle 640 (θ (=θ'·L₃)) is solved for L3 to derive the following Formula (9).

[Formula 9]

$$L_3 = \frac{\theta}{\dot{\theta}} \quad (9)$$

Therefore, the decreasing section (L2 to L3) is expressed by the following Formula (10).

[Formula 10]

$$L_3 - L_2 = \frac{\theta}{\dot{\theta}} - \frac{L_3 + \sqrt{L_3^2 - \frac{4\theta}{\ddot{\theta}_{max}}}}{2} \quad (10)$$

As described above, it is possible to calculate the increasing section, the constant section, and the decreasing section of the steering angular velocity based on the condition that the route length and the vehicle direction are not increased or decreased in Step S404 in FIG. 4. The increasing section, the constant section, and the decreasing section obtained in Step S404 in FIG. 4 are used as an integration section (the transition curve section 610) to obtain the corrected steering angle information. In addition, the steering angle information can be corrected without increasing or decreasing the route length and the vehicle direction using each of the calculated sections.

To sum up the above description, the steering angle correction unit 13a obtains a steering angular velocity pattern corresponding to the change gradient 630, which is the preset steering angular acceleration, such that an integral value 640 of a constant steering angular velocity 620 according to a target steering angle in the steering angle increasing section (the transition curve section 610 in FIG. 6) is equal to an integral value 650 of a steering angular velocity pattern for achieving the target steering angle in the steering angle increasing section 610. In other words, the steering angle correction unit 13a obtains the steering angular velocity pattern corresponding to the change gradient 630, which is the preset steering angular acceleration, such that a rectangular area 640 having a magnitude of the constant steering angular velocity 620 according to the target steering angle in the steering angle increasing section 610 as one side and a length of the steering angle increasing section 610 as the other side is equal to an area 650 of the steering angular velocity pattern for achieving the target steering angle in the steering angle increasing section 610.

Figure 7:
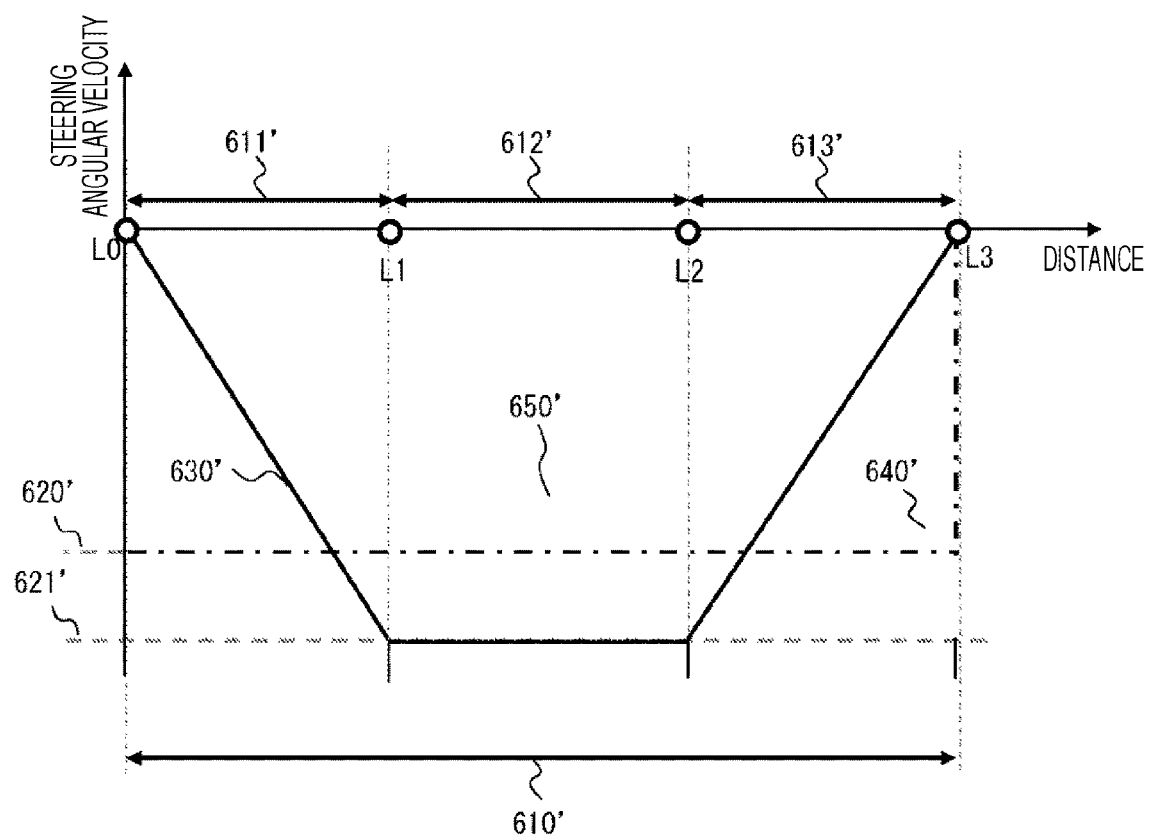
FIG. 7 is a view illustrating a steering angular velocity in a transition curve section (a steering angle decreasing section).

FIG. 7 is a view illustrating the steering angular velocity in the transition curve section 511b (steering angle decreasing section) in FIG. 5(b). The vertical axis in FIG. 7 represents a steering angular velocity, and the horizontal axis represents a distance. FIG. 7 is based on the same concept as FIG. 6 described above.

In FIG. 7, a set steering angular acceleration, that is, a change gradient 630' of the steering angular velocity is set as θ"$_{max}$, the steering angular velocity upper limit 621' is set as θ'$_{max}$, and three sections including a decreasing section 611' (L0 to L1), a constant section 612' (L1 to L2), and an increasing section 613' (L2 to L3) of the steering angular velocity, indicated by steering angle information after correction by the steering angle correction unit 13a are obtained based on a steering angular velocity 620' and a transition curve section 610'. A condition is that a steering angle 640' (the area of a rectangle in an alternate long and short dash line) is equivalent to a steering angle 650' (the area of a trapezoid in a solid line) which is an integral value of a corrected steering angular velocity in the transition curve section 610'.

To sum up the above description, the steering angle correction unit 13a obtains a steering angular velocity pattern corresponding to the change gradient 630', which is a preset steering angular acceleration, such that an integral value 640' of a constant steering angular velocity 620' according to a target steering angle in the steering angle decreasing section (the transition curve section 610' in FIG. 7) is equal to an integral value 650' of a steering angular velocity pattern for achieving the target steering angle in the steering angle decreasing section. In other words, the steering angle correction unit 13a obtains the steering angular velocity pattern corresponding to the change gradient 630', which is the preset steering angular acceleration, such that the area 640' of the rectangle having a magnitude of the constant steering angular velocity 620' according to the target steering angle in the steering angle decreasing section 610' as one side and a length of the steering angle increasing section 610' as the other side is equal to the area 650' of the steering angular velocity pattern for achieving the target steering angle in the steering angle decreasing section 610'.

Next, the correction of the steering angle information in Step S405 in FIG. 4 will be described with reference to FIGS. 8(a) and 8(b).

FIG. 8(a) illustrates an example of a route including a straight line, an arc, and a transition curve, that is, route information after the steering angle correction by the steering angle correction unit 13a based on the route in FIG. 5(a). The route corresponds to a case where a host vehicle 700 moves to a target parking position 790 by one-side turning, and the route on which the host vehicle 700 travels includes a straight section 710a, a transition curve section 711a (a steering angle increasing section), an arc section 712, a transition curve section 711b (steering angle decreasing section), and a straight section 710b.

FIG. 8(b) illustrates steering angle information for the route in FIG. 8(a). The steering angle has been corrected by the steering angle correction unit 13a in accordance with the steering angular velocity pattern obtained in the above-described process of Step S404. The vertical axis represents a steering angle, and the horizontal axis represents a distance.

In the straight section 710a, the steering angle does not change and remains at zero.

In the transition curve section 711a (steering angle increasing section), the steering angle is corrected such that a section 702 where the steering angle exceeds a target steering angle 730 comes after a section 701 where the steering angle is below the target steering angle 730.

In the arc section 712, the steering angle maintains a constant angle.

In the transition curve section 711b (steering angle decreasing section), the steering angle is corrected such that a section 704 where a steering angle is below a target steering angle 731 comes after a section 703 where the steering angle exceeds the target steering angle 731.

In the straight section 710b, the steering angle does not change and remains at zero.

Here, the transition curve section 711a (steering angle increasing section) illustrated in FIG. 8(b) corresponds to the transition curve section 610 illustrated in FIG. 6. Further, the increasing section 721, the constant section 722, and the decreasing section 723 of the transition curve section 711*a* illustrated in FIG. 8(*b*) correspond to the increasing section 611, the constant section 612, and the decreasing section 613 of the steering angular velocity illustrated in FIG. 6, respectively.

The transition curve section 711*b* (steering angle decreasing section) illustrated in FIG. 8(*b*) corresponds to the transition curve section 610' illustrated in FIG. 7. Further, the decreasing section 721', the constant section 722', and the increasing section 723' of the transition curve section 711*b* illustrated in FIG. 8(*b*) correspond to the decreasing section 611', the constant section 612', and the increasing section 613' of the steering angular velocity illustrated in FIG. 7, respectively.

With the steering angle information correction by the steering angle correction unit 13*a*, in the transition curve section 711*a*, the steering angle is corrected to a steering angle 740 having the section 701 below the target steering angle 730 and the section 702 exceeding the target steering angle 730 with respect to the target steering angle 730 that increases with a gradient corresponding to a constant steering angular velocity.

When the steering angular accelerations in the steering angular velocity increasing section and decreasing section are equal, an inflection point 750 switching from the section 701 below the target steering angle to the exceeding section 702 is located at the midpoint of the transition curve section 711*a*, and the section 701 below the target steering angle is equal to the exceeding section 702. In addition, when the steering angular accelerations in the steering angular velocity increasing section and decreasing section are not equal, the inflection point 750 is located at a point in the transition curve section 711*a* close to a side where the steering angular velocity is larger between the steering angular velocity increasing section and decreasing section of the transition curve section 711*a* from the midpoint of the transition curve section 711*a*.

In the transition curve section 711*b*, the steering angle is corrected to a steering angle 741 having the section 703 exceeding a target steering angle 731 and the section 704 below the target steering angle 731 with respect to the target steering angle 731 that decreases with a gradient corresponding to a constant steering angular velocity.

When the steering angular accelerations in the steering angular velocity increasing section and decreasing section are equal, an inflection point 751 switching from the exceeding section 703 to the section 704 below the target steering angle is located at the midpoint of the transition curve section 711*b*, and the exceeding section 703 is equal to the section 704 below the target steering angle. In addition, when the steering angular accelerations in the steering angular velocity increasing section and decreasing section of the transition curve section 711*b* are not equal, the inflection point 751 is located at a point in the transition curve section 711*b* close to a side where the steering angular velocity larger between the steering angular velocity increasing section and decreasing section from the midpoint of the transition curve section 711*b*.

Figure 9:
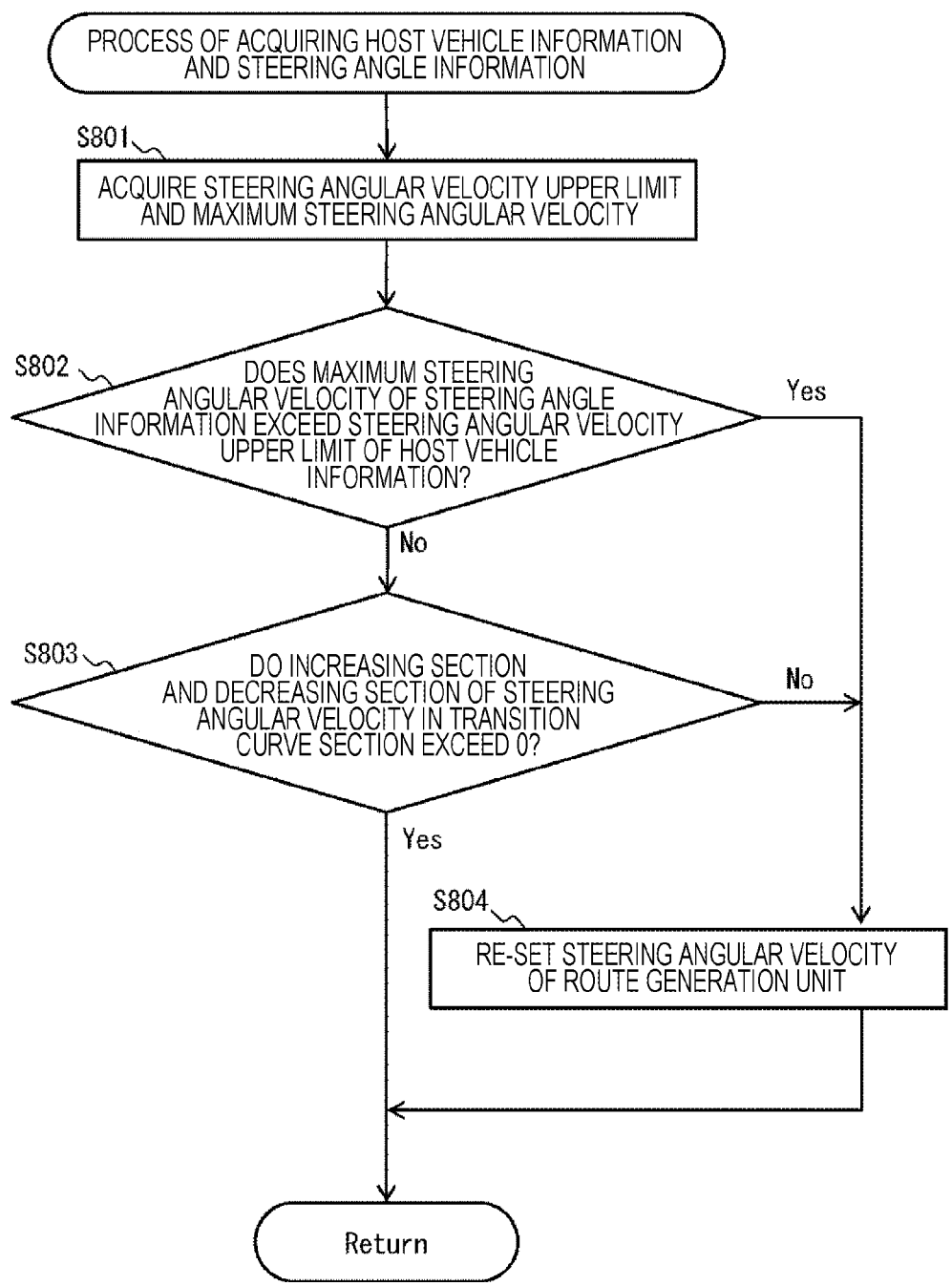
FIG. 9 is a flowchart illustrating a process of acquiring host vehicle information and steering angle information.

Next, a process of acquiring the host vehicle information and the steering angle information in Step S401 in FIG. 4 will be described with reference to FIG. 9. FIG. 9 is a flowchart illustrating details of Step S401.

In Step S801 in FIG. 9, a steering angular velocity upper limit set in the host vehicle information unit 23 and a maximum steering angular velocity output from the steering pattern generation unit 12*a* are acquired, and the processing proceeds to Step S802.

In Step S802, whether the maximum steering angular velocity of the acquired steering angle information exceeds the steering angular velocity upper limit set in the host vehicle information unit 23 is determined based on the maximum steering angular velocity and the steering angular velocity upper limit acquired in Step S801, and the processing proceeds to Step S804 since the steering control of the vehicle is impossible if it is determined that the maximum steering angular velocity exceeds the steering angular velocity upper limit. If it is determined that the maximum steering angular velocity does not exceed the steering angular velocity upper limit, the processing proceeds to Step S803.

In Step S803, whether the steering angular velocity increasing section and decreasing section in the transition curve section exceed zero is determined based on the following Formula (11), and the processing is ended if it is determined that the steering angular velocity increasing section and decreasing section exceed zero. If it is determined that the steering angular velocity increasing section and decreasing section do not exceed zero, it is difficult to correct the steering angle, and thus, the processing proceeds to Step S804.

[Formula 1]

$$1 - \frac{4\dot{\theta}}{\ddot{\theta}_{max}L_3} \geq 0 \quad (11)$$

In Formula (11), θ' indicates the above-described steering angular velocity 620 illustrated in FIG. 6, and θ"$_{max}$ indicates the above-described steering angular acceleration 630 illustrated in FIG. 6, and L3 indicates the above-described route distance illustrated in FIG. 6 until the steering angular velocity becomes zero again.

In Step S804, the steering angular velocity when the route generation unit 11*a* generates the route information is reset based on the following Formula (12), and the processing is ended.

[Formula 12]

$$\dot{\theta} = \frac{\ddot{\theta}_{max}L_3}{4} \quad (12)$$

Figure 10:
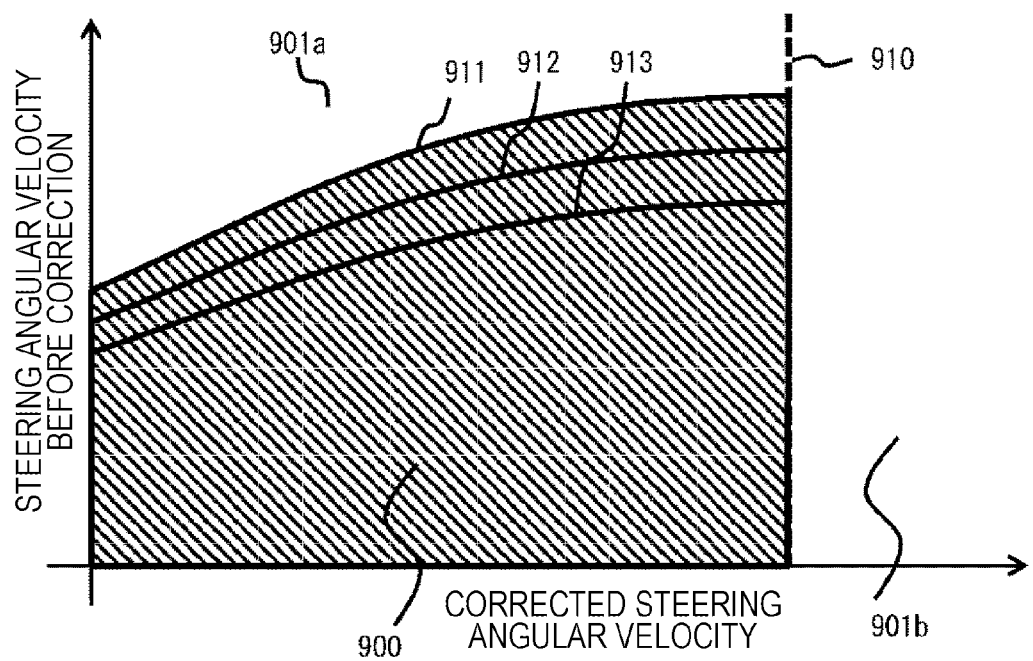
FIG. 10 illustrates an example of a steering angular acceleration feasibility region map.

The determination on the feasibility may be performed with reference to a feasibility region map illustrated in FIG. 10 in addition to the calculation using the geometric calculation of the above Formulas (11) and (12). FIG. 10 illustrates an example of a steering angular acceleration feasibility region map. The vertical axis represents a steering angular velocity before correction, and the horizontal axis represents a corrected steering angular velocity.

In FIG. 10, a hatched region 900 surrounded by a steering angular velocity upper limit 910 and a steering angle correction function 911 is a region where the steering angular velocity correction process is feasible. In addition, regions 901*a* and 901*b* are regions where the correction process is infeasible. The correction function 911 is an example of a function in the case of using a steering angular velocity upper limit of a vehicle. A correction function 912 is an example of a function in the case of using 90% of the steering angular velocity upper limit of the vehicle. A correction function 913 is an example of a function in the case of using 80% of the steering angular velocity upper limit of the vehicle. The correction functions 912 and 913 are appropriately selected when it is not desired to use the steering angular velocity upper limit. A corrected steering angular velocity can be obtained by referring to the correction function 911, 912, or 913 of FIG. 10 based on a steering angular velocity before correction for the steering angular velocity upper limit set by the host vehicle information unit 23.

FIGS. 11(a) and 11(b) are views illustrating examples of a parking state of a vehicle. FIG. 11(a) illustrates a state before parking, and FIG. 11(b) illustrates a state after parking.

As illustrated in FIG. 11(a), a host vehicle 1001 is parked in a parking space 1020. A case of parallel parking in which the host vehicle 1001 is parked in the parking space 1020 such that a parking direction 1031 is perpendicular to a passage direction 1030 of a passage 1021 is illustrated. The parking space 1020 is a region where a section is defined for parking the vehicle in a predetermined direction, and is called a parking frame or a parking place.

In FIG. 11(a), the parking space 1020 is located on the left side of the passage 1021 in the passage direction 1030. The host vehicle 1001 sets the point of the passage 1021 in a vehicle direction which is the same as the passage direction 1030 as an initial position 1002.

At the point of the initial position 1002, the vehicle control device 1 acquires surrounding information, host vehicle information, and target parking information. Then, the vehicle control device 1 generates a route by the route generation unit 11a using the acquired information such that the host vehicle 1001 completes parking in the parking direction 1031 at the parking space 1020, and outputs route information to the steering pattern generation unit 12a. Further, steering angle information is generated by the steering pattern generation unit 12a using the generated route information, and the steering angle information is output to the steering angle correction unit 13a. The steering angle correction unit 13a corrects the steering angle information using the host vehicle information and the steering angle information. Thereafter, the host vehicle 1001 starts moving from the initial position 1002 along a route 1010 to the parking space 1020 while a steering wheel of the host vehicle 1001 is controlled by the steering control unit 14a based on steering angle information corresponding to a moving distance. Then, the host vehicle 1001 is parked in the parking space 1020 as illustrated in FIG. 11(b).

Figure 12:
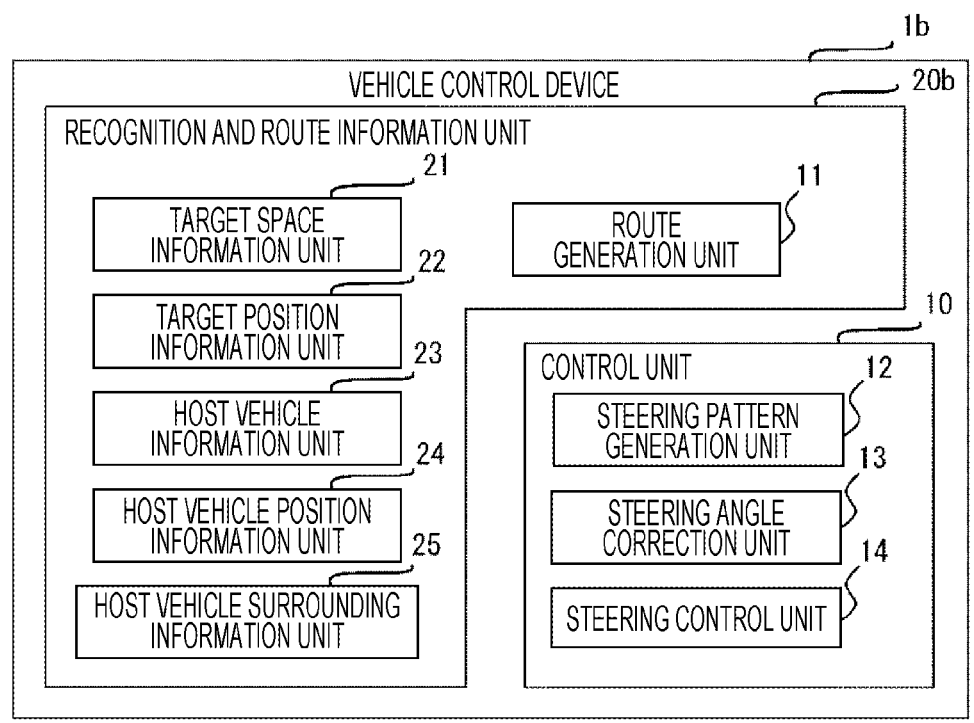
FIG. 12 is a configuration diagram illustrating another example of the vehicle control device.
Figure 13:
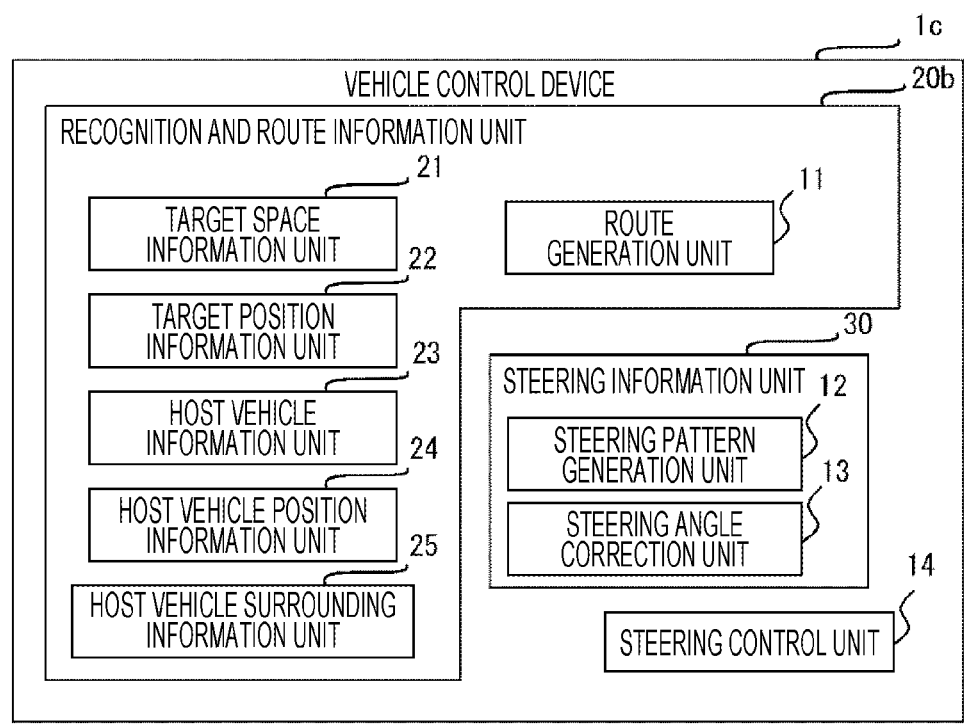
FIG. 13 is a configuration diagram illustrating another example of the vehicle control device.

The configuration of the vehicle control device according to the present embodiment is not limited to FIG. 1 or 2, and may be a configuration illustrated in FIG. 12 or 13. Note that the same parts as those in FIG. 1 or 2 will be denoted by the same reference signs, and the description of the respective parts will be omitted.

As illustrated in FIG. 12, a vehicle control device 1b includes a recognition/route information unit 20b and a control unit 10. The control unit 10 includes the steering pattern generation unit 12, the steering angle correction unit 13, and the steering control unit 14. The recognition/route information unit 20b includes the route generation unit 11, the target space information unit 21, the target position information unit 22, the host vehicle information unit 23, the host vehicle position information unit 24, and the host vehicle surrounding information unit 25.

As illustrated in FIG. 13, a vehicle control device 1c includes the recognition/route information unit 20b, a steering information unit 30, and the steering control unit 14. The steering information unit 30 includes the steering pattern generation unit 12 and the steering angle correction unit 13.

The recognition/route information unit 20b includes the route generation unit 11, the target space information unit 21, the target position information unit 22, the host vehicle information unit 23, the host vehicle position information unit 24, and the host vehicle surrounding information unit 25.

According to the above-described embodiments, the following operational effects are obtained.

(1) The vehicle control device 1a includes: the route generation unit 11a that generates a route from a current location to a destination; the steering pattern generation unit 12a that generates the target steering angle 730 or 731, which is a target value of a steering angle for the route, and outputs steering angle information indicating the generated target steering angle 730 or 731; the steering angle correction unit 13a that corrects the steering angle information such that a section where the target steering angle 730 or 731 changes includes the section 701 or 704 where a steering angle 740 or 741 is below the target steering angle 730 or 731 of the section and a section 702 or 703 where the steering angle 740 or 741 exceeds the target steering angle 730 or 731; and the steering control unit 14a that performs steering control based on the steering angle information corrected by the steering angle correction unit 13a. As a result, it is possible to suppress a sudden change of a steering wheel behavior at the time of steering control which is one of factors causing driver's uncomfortable feeling, and to perform automatic steering with the less discomfort feeling.

(2) In the vehicle control device 1a described in (1), the steering angle correction unit 13a corrects the steering angle information such that the steering angle increasing section 711a where the target steering angle 730 increases includes the section 702 where the steering angle 740 exceeds the target steering angle 730 after the section 701 where the steering angle 740 is below the target steering angle 730. As a result, in the steering angle increasing section 711a, it is possible to suppress the sudden change of the steering wheel behavior at the time of steering control, which is one of factors causing driver's uncomfortable feeling, and to perform the automatic steering with the less discomfort feeling.

(3) In the vehicle control device 1a described in (1) or (2), the steering angle correction unit 13a corrects the steering angle information such that the steering angle decreasing section 711b where the target steering angle 731 decreases includes the section 704 where the steering angle 741 is below the target steering angle 731 after the section 703 where the steering angle 741 exceeds the target steering angle 731. As a result, in the steering angle decreasing section 711b, it is possible to suppress the sudden change of the steering wheel behavior at the time of steering control, which is one of factors causing driver's uncomfortable feeling, and to perform the automatic steering with the less discomfort feeling.

(4) In the vehicle control device 1a described in (2), the steering angle correction unit 13a obtains the steering angular velocity pattern corresponding to the change gradient 630 such that the integral value 640 of the constant steering angular velocity 620 according to the target steering angle in the steering angle increasing section 610 is equal to the integral value 650 of the steering angular velocity pattern for achieving the target steering angle in the steering angle increasing section 610. As a result, in the steering angle increasing section 610, it is possible to suppress the sudden change of the steering wheel behavior at the time of steering control, which is one of factors causing driver's uncomfortable feeling, without increasing or decreasing the route length and the vehicle direction, and to perform the automatic steering with the less discomfort feeling.

(5) In the vehicle control device 1*a* described in (2), the steering angle correction unit 13*a* obtains the steering angular velocity pattern corresponding to the change gradient 630 such that the rectangular area 640 having the magnitude of the constant steering angular velocity 620 according to the target steering angle in the steering angle increasing section 610 as one side is equal to the area 650 of the steering angular velocity pattern for achieving the target steering angle in the steering angle increasing section 610. As a result, in the steering angle increasing section 610, it is possible to suppress the sudden change of the steering wheel behavior at the time of steering control, which is one of factors causing driver's uncomfortable feeling, and to perform the automatic steering with the less discomfort feeling.

(6) In the vehicle control device 1*a* described in (4), the steering angle correction unit 13*a* sets the steering angle increasing section 610 to be equal to the integration section of the integral value 640 of the steering angular velocity 620, in the steering angle increasing section 610. As a result, it is possible to suppress the sudden change of the steering wheel behavior at the time of steering control, which is one of factors causing driver's uncomfortable feeling without increasing or decreasing the route length and the vehicle direction, and to perform the automatic steering with the less discomfort feeling.

(7) In the vehicle control device 1*a* described in (5), the steering angle correction unit 13*a* obtains the rectangular area 640 having the length of the steering angle increasing section 610 as the other side of the rectangle. As a result, it is possible to suppress the sudden change of the steering wheel behavior at the time of steering control, which is one of factors causing driver's uncomfortable feeling without increasing or decreasing the route length and the vehicle direction, and to perform the automatic steering with the less discomfort feeling.

(8) in the vehicle control device is described in (1), the steering angle correction unit 13*a* obtains the integral value 650 or 651' of the steering angular velocity according to the change gradient 630 or 630' corresponding to the preset steering angular acceleration or the area 650 or 651' based on the relationship between the steering angular velocity and the distance of the section such that the steering angular velocity reaches the predetermined upper limit value 621 or 621' in the steering angle increasing section 610 where the target steering angle increases or in a steering angle decreasing section 610' where the target steering angle decreases. As a result, it is possible to suppress a sudden change of a steering wheel behavior at the time of steering control which is one of factors causing driver's uncomfortable feeling, and to perform automatic steering with the less discomfort feeling.

(9) in the vehicle control device is described in (3), the steering angle correction unit 13*a* obtains the steering angular velocity pattern corresponding to the change gradient 630' such that the integral value 640' of the constant steering angular velocity 620' according to the target steering angle in the steering angle decreasing section 610' is equal to the integral value 650' of the steering angular velocity pattern for achieving the target steering angle in the steering angle decreasing section 610'. As a result, the steering angle decreasing section 610', it is possible to suppress the sudden change of the steering wheel behavior at the time of steering control, which is one of factors causing driver's uncomfortable feeling, and to perform the automatic steering with the less discomfort feeling.

(10) In the vehicle control device is described in (9), the steering angle correction unit 13*a* obtains the steering angular velocity pattern corresponding to the change gradient 630' such that the rectangular area 640' having the magnitude of the constant steering angular velocity 620 according to the target steering angle in the steering angle decreasing section 610' as one side is equal to the area 650' of the steering angular velocity pattern for achieving the target steering angle in the steering angle decreasing section 610'. As a result, in the steering angle decreasing section 610', it is possible to suppress the sudden change of the steering wheel behavior at the time of steering control, which is one of factors causing driver's uncomfortable feeling, and to perform the automatic steering with the less discomfort feeling.

(11) In the vehicle control device 1*a* described in (9), the steering angle correction unit 13*a* sets the steering angle decreasing section 610' to be equal to the integration section of the integral value 640' of the steering angular velocity 620', in the steering angle decreasing section 610'. As a result, it is possible to suppress a sudden change of a steering wheel behavior at the time of steering control which is one of factors causing driver's uncomfortable feeling, and to perform automatic steering with the less discomfort feeling.

(12) In the vehicle control device 1*a* according to (10), the steering angle correction unit 13*a* obtains a rectangular area 640' with the length of the steering angle decreasing section 610' as the other side of the rectangle. As a result, it is possible to suppress a sudden change of a steering wheel behavior at the time of steering control which is one of factors causing driver's uncomfortable feeling, and to perform automatic steering with the less discomfort feeling.

(13) In the vehicle control device 1*a* described in any one of (1) to (3), the steering angle correction unit 13*a* determines whether the steering angular velocity based on the steering angle information before correction exceeds the steering angular velocity upper limit value 621 or 621' of the vehicle (Step S802), and corrects the steering angle information if the steering angular velocity does not exceed the upper limit value. As a result, it is possible to suppress the sudden change of the steering wheel behavior at the time of steering control, which is one of factors causing driver's uncomfortable feeling, within the steering angular velocity upper limit value 621 or 621', and to perform the automatic steering with the less discomfort feeling.

(14) In the vehicle control device 1*a* described in (13), when determining that the steering angular velocity based on the steering angle information before correction exceeds the steering angular velocity upper limit value 621 or 621' of the vehicle, the steering angle correction unit 13*a* resets the steering angular velocity when the route generation unit 11*a* generates the route information such that the steering angular velocity based on the steering angle information before correction becomes the upper limit value 621 or 621' (Step S804). As a result, it is possible to suppress the sudden change of the steering wheel behavior at the time of steering control, which is one of factors causing driver's uncomfortable feeling, without exceeding the steering angular velocity upper limit value 621 or 621', and to perform the automatic steering with the less discomfort feeling.

(Modifications)

The present invention can be implemented by modifying the above-described embodiments as follows.

(1) Although the automatic parking in which the host vehicle moves to the target parking position by the one-side turning has been described as an example, the present embodiments can be applied not only to the one-side turning but also to a route with S-shaped turning including the transition curve section 711a (steering angle increasing section) and the transition curve section 711b (steering angle decreasing section).

(2) Although the parking route of the automatic parking has been described as an example, the present embodiments can be applied not only to the parking route of the automatic parking but also to a route by automatic driving in the case of including the transition curve section 711a (steering angle increasing section) and the transition curve section 711b (steering angle decreasing section).

The present invention is not limited to the above-described embodiments, and other modes, which are conceivable inside a scope of a technical idea of the present invention, are also included in a scope of the present invention as long as characteristics of the present invention are not impaired. In addition, the invention may be configured by combining the embodiments and modifications.

REFERENCE SIGNS LIST 1, 1a, 1b, 1c vehicle control device
10 control unit
11 route generation unit
12 steering pattern generation unit
13, 13a steering angle correction unit
14 steering control unit
20, 20a recognition information unit
20b recognition/route information unit
21 target space information unit
21a target parking space information unit
22 target position information unit
22a target parking position information unit
23 host vehicle information unit
24 host vehicle position information unit
25 host vehicle surrounding information unit
30 steering information unit
500 host vehicle
501 target parking position
510 straight section
511a, 511b transition curve section
512 arc section
610 transition curve section
611 increasing section
612 constant section
613 decreasing section
620, 620' steering angular velocity
621, 621' steering angular velocity upper limit
630, 630' steering angular acceleration
640, 640' steering angle (before correction)
650, 650' steering angle (after correction)
701 section below steering angle before correction in steering angular velocity increasing section
702 section exceeding steering angle before correction in steering angular velocity increasing section
703 section exceeding steering angle before correction in steering angular velocity decreasing section
704 section blow steering angle before correction in steering angular velocity decreasing section
711a, 711b transition curve section
730 target steering angle (before correction)
731 target steering angle (before correction)
740 corrected steering angle in steering angular velocity increasing section
741 corrected steering angle in steering angular velocity decreasing section
750 inflection point in steering angular velocity increasing section
751 inflection point in steering angular velocity decreasing section
900 correction feasible region
901a, 901b correction infeasible region
910 steering angular velocity upper limit
911, 912, 913 steering angle correction function
1001 host vehicle
1002 initial position
1020 parking space
1021 passage
1030 passage direction
1031 parking direction

The invention claimed is:

1. A vehicle control device comprising:
a route processor that is configured to generate a route from a current location position to a target position, wherein the target position remains constant;
a steering pattern processor that is configured to generate a target steering angle, which is a target value of a steering angle for the route at which a steering angular velocity is constant, and outputs steering angle information indicating the generated target steering angle;
a steering angle processor that is configured to correct the steering angle information by generating a plurality of sections for the route under a condition that a length of the route and a direction of a vehicle are not increased or decreased, the plurality of sections comprising:
a steering angle increasing section comprising a first section where the steering angle is set below the target steering angle and a second section where the steering angle is set above the target steering angle,
a steering angle constant section where the steering angle is constant and set to the target steering angle, and
a steering angle decreasing section comprising a first section where the steering angle is set above the target steering angle and a second section where the steering angle is set below the target steering angle,
wherein the steering angle constant section immediately follows the second section of the steering angle increasing section and immediately precedes the first section of the steering angle decreasing section, and
wherein the steering angle processor is configured to increase the steering angular velocity in the first section of the steering angle increasing section and the second section of the steering angle decreasing section, where the steering angle is set below the target steering angle, and to decrease the steering angular velocity in the second section of the steering angle increasing section and the first section of the steering angle decreasing section, where the steering angle is set above the target steering angle; and
a steering controller that is configured to perform steering control, based on the steering angle information corrected by the steering angle processor, along entirety of the route from the current location position to the target position.

2. The vehicle control device according to claim 1, wherein:
the second section of the steering angle increasing section is disposed after the first section of the steering angle increasing section.

3. The vehicle control device according to claim 1, wherein:

the second section of the steering angle decreasing section is disposed after the first section of the steering angle decreasing section.

4. The vehicle control device according to claim 2, wherein:
the steering angle processor obtains a steering angular velocity pattern based on a preset steering angular acceleration such that an integral value of a constant steering angular velocity according to the target steering angle in the steering angle increasing section is equal to an integral value of the steering angular velocity pattern for achieving the target steering angle in the steering angle increasing section.

5. The vehicle control device according to claim 2, wherein:
the steering angle processor obtains a steering angular velocity pattern based on a preset steering angular acceleration such that an area of a rectangle having a magnitude of a constant steering angular velocity according to the target steering angle in the steering angle increasing section as one side is equal to an area of a steering angular velocity pattern for achieving the target steering angle in the steering angle increasing section.

6. The vehicle control device according to claim 4, wherein:
the steering angle processor sets the steering angle increasing section to be equal to an integration section of the integral value of the steering angular velocity, in the steering angle increasing section.

7. The vehicle control device according to claim 5, wherein:
the steering angle processor obtains the area of the rectangle using a length of the steering angle increasing section as another side of the rectangle.

8. The vehicle control device according to claim 1, wherein:
the steering angle processor obtains an integral value of a steering angular velocity according to a preset steering angular acceleration or an area based on a relationship between a steering angular velocity and a distance of a selected section such that the steering angular velocity reaches a predetermined upper limit value in the selected section, the selected section being either the steering angle increasing section or the steering angle decreasing section.

9. The vehicle control device according to claim 3, wherein:
the steering angle processor obtains a steering angular velocity pattern based on a preset steering angular acceleration such that an integral value of a constant steering angular velocity according to the target steering angle in the steering angle decreasing section is equal to an integral value of the steering angular velocity pattern for achieving the target steering angle in the steering angle decreasing section.

10. The vehicle control device according to claim 3, wherein:
the steering angle processor obtains a steering angular velocity pattern based on a preset steering angular acceleration such that an area of a rectangle having a magnitude of a constant steering angular velocity according to the target steering angle in the steering angle decreasing section as one side is equal to an area of a steering angular velocity pattern for achieving the target steering angle in the steering angle decreasing section.

11. The vehicle control device according to claim 9, wherein:
the steering angle processor sets the steering angle decreasing section to be equal to an integration section of the integral value of the steering angular velocity, in the steering angle decreasing section.

12. The vehicle control device according to claim 10, wherein:
the steering angle processor obtains the area of the rectangle using a length of the steering angle decreasing section as another side of the rectangle.

13. The vehicle control device according to claim 1, wherein:
the steering angle processor determines whether a steering angular velocity based on the steering angle information before correction exceeds a steering angular velocity upper limit value of a vehicle, and corrects the steering angle information if the steering angular velocity does not exceed the upper limit value.

14. The vehicle control device according to claim 13, wherein:
when determining that a steering angular velocity based on the steering angle information before correction exceeds the steering angular velocity upper limit value of the vehicle, the steering angle processor resets a steering angular velocity when the route generator generates the route such that the steering angular velocity based on the steering angle information before correction becomes the upper limit value.

15. The vehicle control device according to claim 1, wherein the plurality of sections further comprises:
an initial steering angle section where the steering angle is constant and set to the target steering angle, the initial steering angle section immediately precedes the first section of the steering angle increasing section; and
a final steering angle section where the steering angle is constant and set to the target steering angle, the final steering angle section immediately follows the second section of the steering angle decreasing section.

16. The vehicle control device according to claim 15, wherein the steering angle and the target steering angle of the initial steering angle section and the final steering angle section is zero degrees.

* * * * *